United States Patent
Kobylinski et al.

(10) Patent No.: US 7,515,660 B2
(45) Date of Patent: Apr. 7, 2009

(54) JOINT DEMODULATION USING A VITERBI EQUALIZER HAVING AN ADAPTIVE TOTAL NUMBER OF STATES

(75) Inventors: Richard A. Kobylinski, Austin, TX (US); David Randall Wolter, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 12/014,348

(22) Filed: Jan. 15, 2008

(65) Prior Publication Data

US 2008/0112515 A1    May 15, 2008

Related U.S. Application Data

(63) Continuation of application No. 10/737,175, filed on Dec. 15, 2003, now Pat. No. 7,346,130, which is a continuation of application No. 10/037,300, filed on Dec. 20, 2001, now Pat. No. 6,714,607.

(51) Int. Cl.
*H03D 1/00* (2006.01)
*H03M 13/03* (2006.01)

(52) U.S. Cl. ...................... 375/341; 714/795

(58) Field of Classification Search ............. 375/41, 375/340, 316, 229, 230, 232, 346, 350, 150, 375/147; 714/794, 792, 795, 786, 796; 704/242, 704/216, 218, 237, 263; 708/5, 422, 813
See application file for complete search history.

(56) References Cited

U.S. PATENT DOCUMENTS

| | | | |
|---|---|---|---|
| 5,432,821 | A | 7/1995 | Polydoros et al. |
| 5,566,209 | A | 10/1996 | Forssen et al. |
| 5,644,603 | A | 7/1997 | Ushirokawa |
| 5,790,606 | A | 8/1998 | Dent |
| 5,995,499 | A | 11/1999 | Hottinen et al. |
| 6,067,295 | A | 5/2000 | Bahai et al. |
| 6,137,843 | A | 10/2000 | Chennakeshu et al. |
| 6,144,710 | A | 11/2000 | Chen et al. |
| 6,256,336 | B1 | 7/2001 | Rademacher et al. |
| 6,298,102 | B1 | 10/2001 | Rainish et al. |
| 6,304,618 | B1 | 10/2001 | Hafeez et al. |
| 6,314,147 | B1 | 11/2001 | Liang et al. |
| 6,327,317 | B1 | 12/2001 | Chennakeshu et al. |
| 6,671,338 | B1 | 12/2003 | Gamal et al. |
| 6,714,607 | B2 | 3/2004 | Kobylinski et al. |
| 2002/0044614 | A1 | 4/2002 | Molnar et al. |
| 2005/0201326 | A1 | 9/2005 | Lakkis |

*Primary Examiner*—Tesfaldet Bocure
*Assistant Examiner*—Vineeta S Panwalkar
(74) *Attorney, Agent, or Firm*—Brinks Hofer Gilson & Lione

(57) ABSTRACT

Systems and methods for performing joint demodulation using a Viterbi equalizer having an adaptive total number of states are disclosed. Generally, a method includes joint demodulating a desired signal and none or more interfering signals with a Viterbi equalizer having an adaptive total number of states based on channel impulse response (CIR) coefficients associated with a desired signal ant the one or more interfering signals.

22 Claims, 5 Drawing Sheets

| STATE S | $m_{n-1}$ | $m_{n-2}$ | $m_{n-3}$ | $m_{n-4}$ |
|---|---|---|---|---|
| 0 | +1 | +1 | +1 | +1 |
| 1 | +1 | +1 | +1 | -1 |
| 2 | +1 | +1 | -1 | +1 |
| 3 | +1 | +1 | -1 | -1 |
| 4 | +1 | -1 | +1 | +1 |
| 5 | +1 | -1 | +1 | -1 |
| 6 | +1 | -1 | -1 | +1 |
| 7 | +1 | -1 | -1 | -1 |
| 8 | -1 | +1 | +1 | +1 |
| 9 | -1 | +1 | +1 | -1 |
| 10 | -1 | +1 | -1 | +1 |
| 11 | -1 | +1 | -1 | -1 |
| 12 | -1 | -1 | +1 | +1 |
| 13 | -1 | -1 | +1 | -1 |
| 14 | -1 | -1 | -1 | +1 |
| 15 | -1 | -1 | -1 | -1 |

US 7,515,660 B2

JOINT DEMODULATION USING A VITERBI EQUALIZER HAVING AN ADAPTIVE TOTAL NUMBER OF STATES

RELATED APPLICATIONS

The present application is a continuation of U.S. patent application Ser. No. 10/737,175, filed Dec. 15, 2003 now U.S. Pat. No. 7,346,130, which is a continuation of U.S. patent application Ser. No. 10/037,300 (now U.S. Pat. No. 6,714,607), filed Dec. 20, 2001, the entirety of each of which is hereby incorporated by reference.

FIELD OF THE INVENTION

The present invention relates to joint demodulation of desired and interfering signals in Time Division Multiple Access (TDMA) wireless networks for both mobile and fixed applications.

BACKGROUND

In mobile and fixed TDMA networks, frequencies may be reused throughout a given area. Cells are sufficiently separated to insure that co-channel interference is small relative to the desired signal. However, there are limits to how often a frequency can be reused since eventually the carrier-to-interference (C/I) ratio becomes too small for the receiver to properly process a received signal. Since reusing frequencies more often implies more channels per cell or sector, and a corresponding increase in capacity, there is great motivation to develop receivers which can operate at low values of C/I (e.g. 4 dB and below).

Many interference cancellation techniques other than joint demodulation require at least two antennas on the receive path. Although cellular and personal communication system (PCS) base station equipment typically employ multiple antennas on the receive path, mobile terminals and handset typically employ only a single antenna in light of aesthetics and space constraints.

In conventional receivers employing a single antenna, a number of signal processing techniques may be employed to develop an estimate of the desired signal. A common receiver implementation for wireless networks with multipath fading uses a Maximum Likelihood Sequence Estimator (MLSE). A detailed description of MLSE can be found in Forney, "Maximum Likelihood sequence estimation of digital sequences in the presence of intersymbol interference", IEEE Transactions on Information Theory, Vol, IT-18, pp. 363-378, May 1972.

The MLSE attempts to generate all possible received signals based on all possible transmitted sequences. The resulting locally-generated estimates are compared to the signal that is actually received. The locally-generated signal that most closely matches the received signal indicates the most likely transmitted sequence. The baseband signal flow associated with such a receiver and its corresponding transmitter is shown in FIG. 1.

A bit stream b(t) is input to a modulator 10. Based on its input bit(s)-to-modulator symbol mapping, the modulator 10 produces an output m(t). The output m(t) is an input to a wireless channel 12. For purposes of this discussion, the wireless channel 12 is assumed to be characterized as slow, frequency-selective Rayleigh fading. The "slow" description implies that the wireless channel 12 does not change significantly over a symbol time of the modulator 10. The "frequency-selective" descriptor implies the existence of multipath, the delay of which from the main signal is a significant portion of the modulator symbol time (e.g. greater than 25%). The wireless channel 12 introduces intersymbol interference (ISI), which typically must be compensated for to achieve satisfactory receiver performance. The desired signal after traversing the wireless channel 12 is denoted as C(t).

A separate, co-channel interfering bit stream is denoted by $b_i(t)$. A modulator 14 produces an output $m_i(t)$ based on the interfering bit stream $b_i(t)$. The output $m_i(t)$ is an input to a wireless channel 16. A resultant signal of the separate interfering signal path is denoted as I(t).

Although only one interfering signal is shown, there may be more than one interferer depending on frequency reuse of the underlying cellular or PCS network. On a TDMA burst-by-burst basis, there may be one or more interferers whose respective signal powers contribute significantly to the total interference power. For simplicity in discussion, only one interferer is shown.

A received signal r(t) is equal to a sum of C(t) and I(t). The received signal r(t) is input to a MLSE 20. The MLSE 20 may use a Viterbi algorithm to implement the MLSE functionality. In this case, the MLSE 20 may also be referred to as a Viterbi equalizer. A key parameter of the Viterbi equalizer is the number of processing states. The number of processing states is typically calculated by $M^L$, where M represents a modulator alphabet size, and L represents a memory order of the path between the modulator input and the input to the equalizer. For example, a link employing a binary modulation format, M=2, and a memory order of L=4 would require a $2^4$=16-state Viterbi equalizer. A particular state in this example is defined by the four previous modulator symbols, $m_{n-1}$ to $m_{n-4}$, wherein the time dependence is accounted for in the subscripts. Assuming the modulator alphabet consists of +1 and −1, the states are defined by the 16 possible combinations of +1 and −1. A possible previous modulator output-to-state mapping is shown in FIG. 2. This particular configuration implies that a current received signal $r_n$ can be estimated as a function of a current modulator output symbol $m_n$ and the four previous modulator output symbols $m_{n-1}$ to $m_{n-4}$ convolved with a channel impulse response (CIR) of the desired signal path.

In general, the signal estimate for state s can be expressed mathematically as:

$$\hat{r}_n = \sum_{l=1}^{L+1} \hat{h}_n(l) m^{(s)}_{n-l+1} \quad (1)$$

where $\hat{h}_n(l)$ is the $l^{th}$ coefficient of the estimate of the CIR for the desired signal path at time n, and $m^{(s)}$ is the previous modulator symbol sequence associated with state s plus the current symbol.

The computation performed for each processing state at each trellis stage within the Viterbi equalizer determines the distance squared between the actual received signal and the locally-generated estimates developed using the above equation. The equation for distance squared is:

$$d^2 = |real(r_n) - real(\hat{r}_n)|^2 + |imag(r_n) - imag(\hat{r}_n)|^2 \quad (2)$$

where real( ) and imag( ) are the real and imaginary parts of the respective quantities.

This calculation is often called a branch metric calculation. The branch metric calculation is added to the cumulative metric associated with each state to produce a new set of cumulative metrics as in a standard Viterbi algorithm. For binary modulation, there are two new cumulative metrics generated for each state: one for each of the two possible modulator symbols. Thus, for a 16-state equalizer, there are 32 new paths generated at each trellis stage. At each new state, there are two incident paths. The path having the minimum cumulative metric is selected as the surviving path. This implies that the selected path is a better match to the received signal sequence than the non-selected path. The detailed processing associated with a Viterbi equalizer is described in many references, such as Forney, "The Viterbi Algorithm", Proceedings of the IEEE, Vol. 61, No. 3, March 1973, pp. 268-278. The end result is that the Viterbi equalizer produces an estimate of the transmitted bit stream b(t) that was input to the modulator 10. Soft decisions would be employed if there was a following stage of channel decoding as is the case for Global System for Mobile Communications (GSM) and ANSI-136 TDMA networks. Soft decisions are described in Hagenauer et al., "A Viterbi Algorithm with Soft-Decision Outputs and its Applications", CH2682-3/89/0000-1680, 1989, IEEE.

From the above discussion, it is apparent that the complexity of the equalizer is driven by the number of states, since the amount of processing and memory required increases significantly with this key parameter. Further, since the number of states is seen to grow exponentially with the memory order L, it is important to set L to just what is needed to properly process the received signal. Too high a value of L results in a prohibitive amount of processing, while too low a value of L results in poorer signal estimates and thus poorer performance.

Conventional receivers estimate the maximum amount of memory that all of the possible channels may introduce. The number of states is set based on this value, provided that it is not prohibitively large so as to significantly impact complexity. For example, in the GSM network, the most demanding wireless channel from a memory perspective is Hilly Terrain (HT). A detailed description of the HT channel model can be found in the following reference: Digital Cellular Telecommunications System (Phase 2+); Radio Transmission and Reception, (GSM 05.05 version 8.4.0 Release 1999). In the HT channel model, multipath is defined with delays as great as 20 microseconds. Since a Gaussian minimum shift keying (GMSK) symbol time is approximately 3.7 microseconds, L is seen to lie between 5 and 6. However, the power in the multipath components is typically much less than the main signal, and simulations have shown that an L of 4 is sufficient. Thus, most existing GSM equipment uses a 16-state Viterbi equalizer for the binary GMSK modulation format.

Although joint demodulation concepts have been described in the literature, one of the primary issues that have limited their usefulness is implementation complexity.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figures 1, 2:
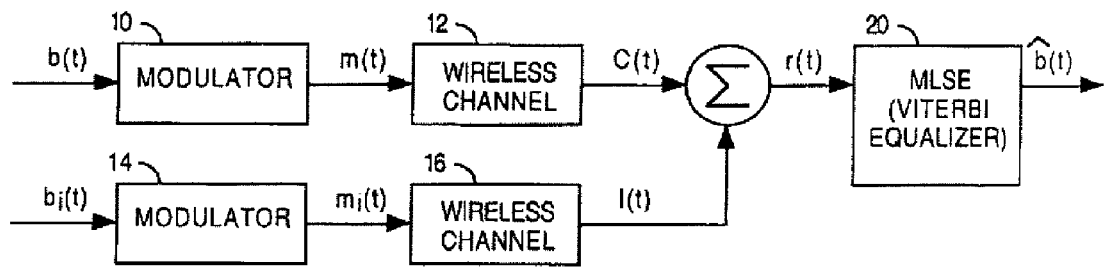
FIG. 1 is a block diagram illustrating signal paths from a desired transmitter and an interfering transmitter to a receiver.
FIG. 2 is a table showing a modulator output-to-state mapping.

Embodiments of the present invention address the complexity issue by limiting the joint processing of the desired signal and the interfering signal(s) to just what is required based on estimated channel conditions. Instead of locally generating estimates of all possible signals based solely on the desired signal, the Viterbi equalizer generates local estimates of the composite signal consisting of the desired and interfering signals. Mathematically, this is accomplished by modifying equation (1) to include the interfering signal. The resulting equation is as follows:

$$\hat{r}_n = \sum_{l=1}^{L+1} \hat{h}_n(l) m_{n-l+1}^{(s)} + \sum_{l=1}^{L_i+1} \hat{h}_{i_n}(l) m_{i_{n-l+1}}^{(s)} \quad (3)$$

where the second summation accounts for the interfering signal. The CIR of the interfering signal is different that the desired signal since the two signals are assumed to undergo independent fading. In addition, the modulator outputs are different since the signals are representative to two unique voices and/or data users. These differences are accounted for in equation (3) using the subscript "i" for the respective variables. Also note that the memory order of the interferer, $L_i$, is not necessarily equal to the memory order of the desired signal, L.

For joint demodulation, the number of processing states within the Viterbi equalizer is now given by the alphabet size M raised to the $(L+L_i)$ power. Thus, the impact of joint demodulation is to increase the number of states over that typically required to process only the desired signal. In addition, accounting for both the current desired and interfering symbols, the number of branch metric calculations per state is $M^2$. For example, in a GSM network with GMSK signals, to represent the interference to the same level of fidelity as is commonly used today for the desired signal, the $L_i=L=4$ and the resultant number of states is $2^{(4+4)}=256$. A Viterbi equalizer with 256 states is theoretically feasible, but does not lend itself to a practical implementation at the time of filing this patent application due to the significant increase in processing and memory compared to a 16-state equalizer. This is especially true of mobile terminal implementations where space and battery power are limited.

To circumvent this problem, and still achieve most of the gains associated with joint demodulation, embodiments of the present invention adapt the total number of states on a TDMA burst-by-burst basis, and limit the number of states to what is required based on current channel conditions. The specific number of states for a given burst is dependent upon the power distribution within the CIRs for the desired and interfering signals for the burst. For example, if the estimated CIR for the desired and interfering signals shows significant energy for only the first three coefficients, then $L=L_i=2$, and a 16-state equalizer suffices. If the desired signal has significant energy in the first five coefficients, and the interfering signal has significant energy in only the first two coefficients, then $L=4$, $L_i=1$, and the number of states is equal to 32. By adapting on a burst-by-burst basis, the instantaneous complexity of the equalizer is reduced and preferably minimized. An advantage of this approach is that the power consumed is kept low, and preferably to a minimum, as the receiver processing is matched to channel conditions.

In addition to the HT channel model, a Typical Urban (TU) channel model and a Rural Area (RA) channel model are defined for GSM networks. Both the TU and the RA models are much less demanding from a memory perspective, with maximum path delays of 5 and 0.5 microseconds, respectively. In addition, channel conditions similar to these two models are much more likely to occur than the HT model, which is limited to mountainous areas of the world. The TU channel model is indicative of what is encountered in a typical city. With a maximum path delay of 5 microseconds, a memory order of two suffices for GSM signals. For the RA model, there is essentially no memory. Thus, only the current symbol is processed from a wireless channel perspective. Note that the use of GMSK modulation in GSM introduces a memory order of two in the modulation process alone, and that the minimum value for L or $L_i$ is always two regardless of the wireless channel. Thus, the joint demodulation with a 16-state Viterbi equalizer suffices for the vast majority of mobile conditions encountered. This is important since the vast majority of existing implementations are typically limited to 16 states.

For the extreme conditions represented by the HT channel model, the number of states can be increased beyond 16, but limited to some maximum value to insure a practical implementation. The maximum value is determined by trading off performance versus an amount of processing power and memory available for a given receiver. For example, a practical maximum value for a new GSM receiver at the time of filing this patent application is about 64 states. One having ordinary skill will recognize that the maximum value will change as the processing power and the amount of memory per area increases. Note also that the maximum value for a base station design may be different (e.g. typically more) than a mobile terminal design since space and power are not as important for the base station.

Figure 3:
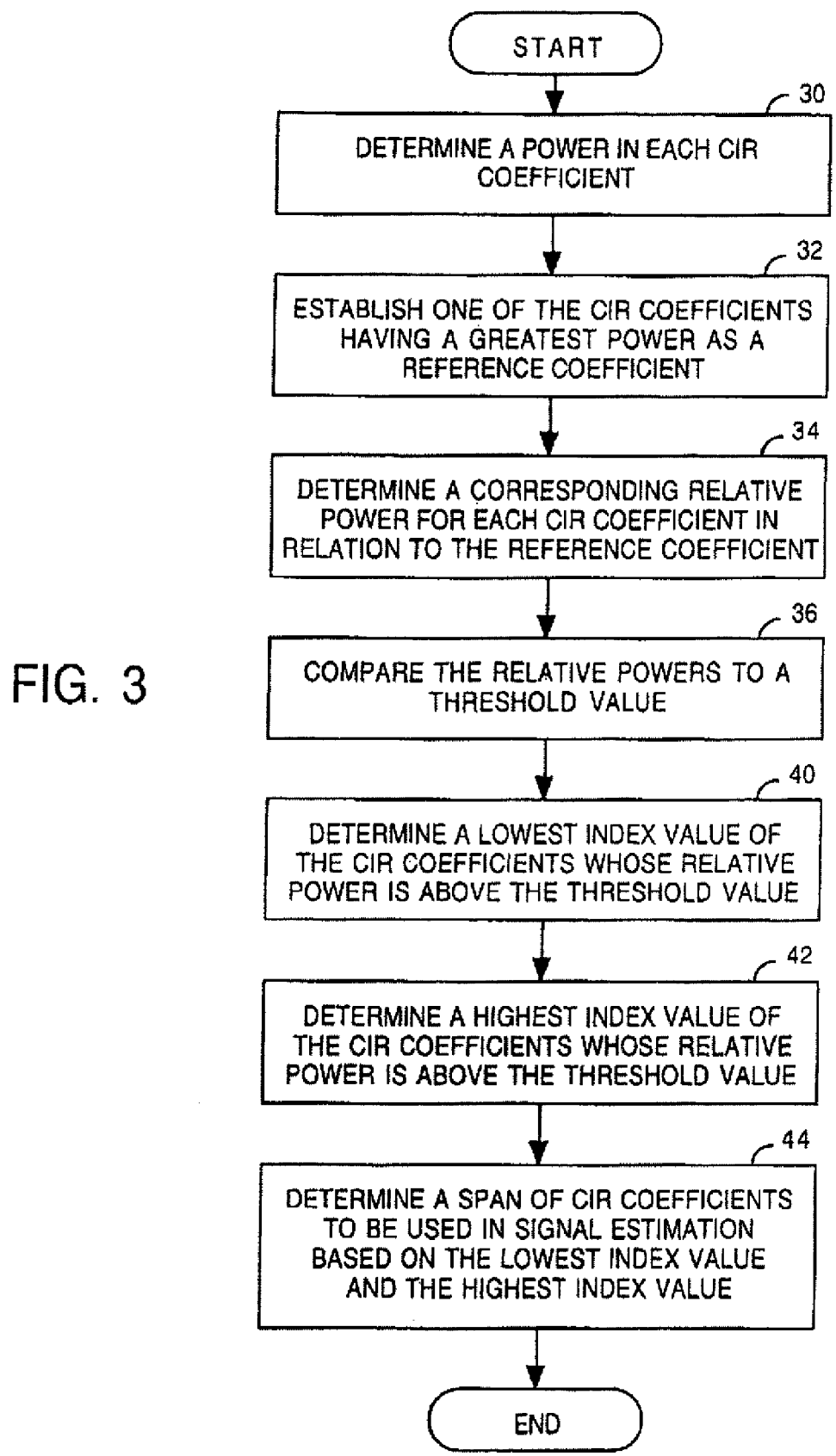
FIG. 3 is a flow chart of an embodiment of a method of determining the memory order of the desired and interfering signals.

FIG. 3 is a flow chart of an embodiment of a method of determining the memory order for either the desired signal or an interfering signal. As indicated by block 30, the method comprises determining a power in each CIR coefficient. The CIR is a complex vector consisting of $L_{max}+1$ elements, where $L_{max}$ is the maximum allowable value for the memory order. The power in each coefficient is given by the magnitude squared of the coefficient. For purposes of illustration, an example where $L_{max}=4$ is considered. In this example, the power in the five CIR coefficients at time n are as follows: $h_n(1)=-9.59$ dB, $h_n(2)=-1.51$ dB, $h_n(3)=-9.59$ dB, $h_n(4)=-34.1$ dB, and $h_n(5)=-57.1$ dB. The above values are representative of a GSM GMSK modulated signal with no fading, but cascaded with a receiver filter before the equalizer with a 3 dB bandwidth of approximately 100 kHz.

As indicated by block 32, the method comprises establishing one of the CIR coefficients having a greatest power as a reference coefficient. The reference coefficient may be the first coefficient in some cases, but may be another coefficient in other cases. For GMSK signals in the absence of fading, the reference coefficient is the second coefficient. In the above example, the second element is the reference coefficient since $-1.51$ dB is the greatest power value.

As indicated by block 34, the method comprises determining a corresponding relative power of each CIR coefficient in relation to the reference coefficient. If the powers are expressed in a linear scale, each relative power is determined by dividing the power in each of the CIR coefficients by the power in the reference coefficient. If the powers are expressed in a logarithmic scale such as dB, each relative power is determined by subtracting the power in the reference coefficient from the power in the each of the CIR coefficients. The relative power in the reference coefficient is 1 using a linear scale, and 0 using a logarithmic scale. Continuing with the above example, the relative powers in dB are as follows: $h_n(1)=-8.08$ dB, $h_n(2)=0$ dB, $h_n(3)=-8.08$ dB, $h_n(4)=-32.59$ dB, and $h_n(5)=-55.59$ dB.

As indicated by block 36, the method comprises comparing the relative powers to a threshold value. In the above example, the threshold value is selected to be $-20$ dB. Thus, the first, second and third relative powers are above the threshold value, and the fourth and fifth relative powers are below the threshold value.

As indicated by block 40, the method comprises determining a lowest index value of the CIR coefficients whose relative power is above the threshold value. In the above example, the lowest index value is 1.

As indicated by block 42, the method comprises determining a highest index value of the CIR coefficients whose relative power is above the threshold value. In the above example, the highest index value is 3.

As indicated by block 44, the method comprises determining a span of CIR coefficients to be used in signal estimation based on the lowest index value and the highest index value. In the above example, the first and third CIR coefficients define the span of coefficients to be used in signal estimation. Thus, the memory order L is set to two, since the signal estimate is to be based on the current symbol and the previous two symbols.

The above method is applied to both the desired and interfering signal channel estimates to determine L and $L_i$, and ultimately the number of equalizer states for each burst.

The above method may be extended to consider a plurality of interfering signals. For N interferers, the number of states required is given by:

$$s = M^{L+\Sigma_{k=1}^{N} L_{ik}} \qquad (4)$$

where $L_{ik}$ is the memory order of the $k^{th}$ interferer. For example, for $N=2$, $M=2$ and $L=L_{i1}=L_{i2}=2$, the resulting number of states s is equal to 64. If the memory order is increased to three for each of the signals, the resulting number of states s is equal to 512. Although theoretically sound, using 512 states presently may be impractical to implement in some applications given finite processing and space. In addition, the number of branch metric calculations per state increases to $M^{(N+1)}$.

Although multiple co-channel interferers may exist in a mobile or fixed wireless network, often only one of the interferers is dominant on a TDMA burst-by-burst basis. Thus, all of the detected interfering signals can be initially processed to determine which one has the most signal power. In one embodiment, joint demodulation processing is limited just to the interferer with the most signal power. This can be accomplished in the CIR estimation processing since the power in the CIR coefficients would be indicative of the power in each of the signals. However, the present invention does not preclude processing multiple interferers, particularly when the respective interfering signal powers are of about the same magnitude. For example, if two interferers have nearly equal powers on the same burst, then processing both is required for significant gains in performance. Processing just one of the two would theoretically provide a gain of approximately 3 dB, whereas processing both could lead to larger gains. The key is to process just what is required much in the manner of determining memory order is discussed herein. Thus, an algorithm similar to that in FIG. 3 is contemplated which compares all of the detected interfering signal powers, and then processes those interferers whose relative powers are within some threshold of the interferer with the most signal power. Processing multiple interferers is manageable if the number of states required per equation (4) and the resulting complexity is manageable using state-of-the-art processing.

Figure 4:
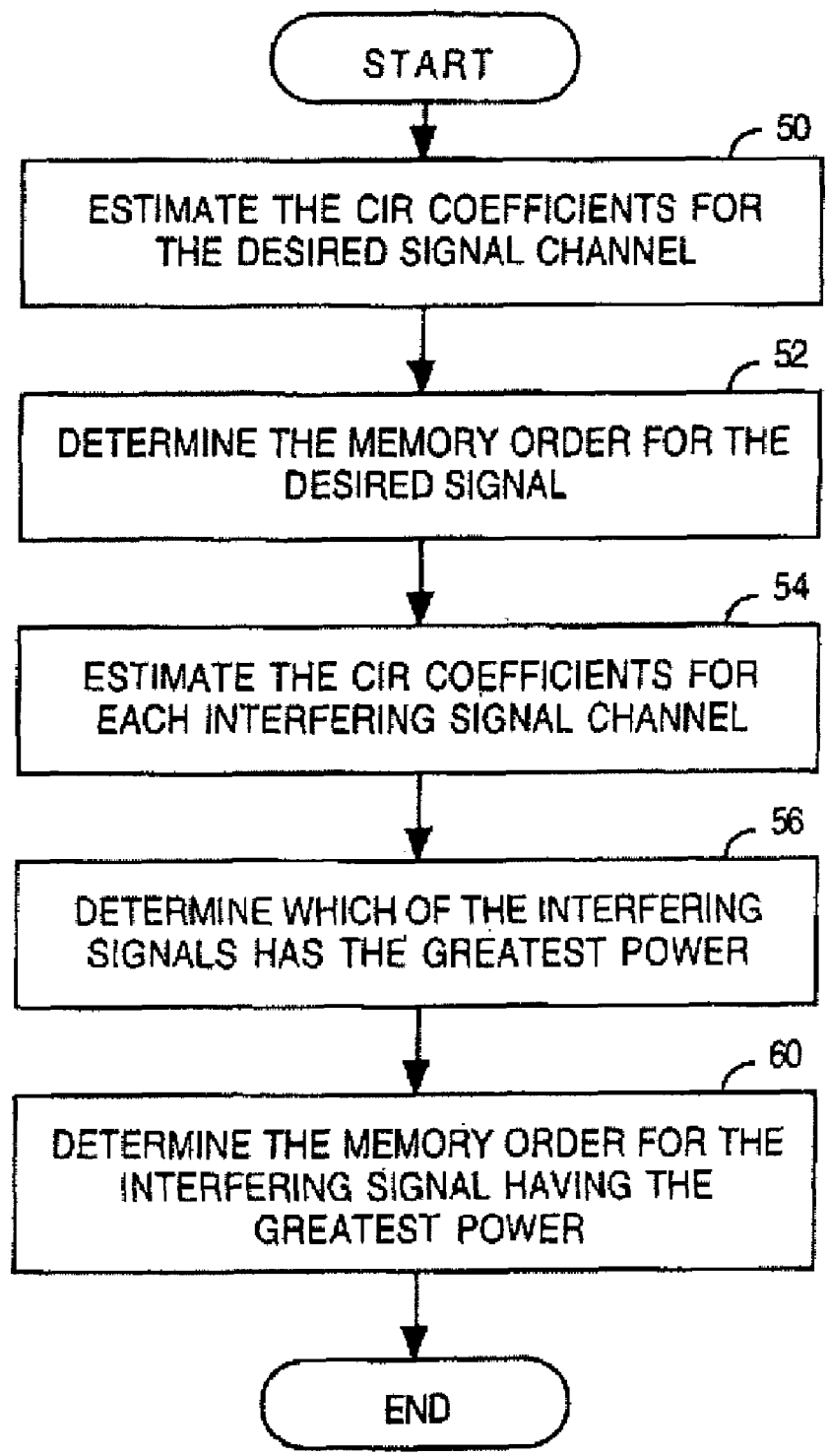
FIG. 4 is a flow chart of an embodiment of a method of determining the number of equalizer states for each burst.

The above features, when only one interferer is processed, are summarized in FIG. 4, which is a flow chart of an embodiment of a method of determining the number of equalizer states for each burst. As indicated by block 50, the method comprises estimating the CIR coefficients for the desired signal channel. As indicated by block 52, the method comprises determining the memory order L for the desired signal. The memory order L is determined by applying the method of FIG. 3 to the CIR coefficients for the desired signal channel. As indicated by block 54, the method comprises estimating the CIR coefficients for each interfering signal channel that is detected. As indicated by block 56, the method comprises determining which of the detected interfering signals has the greatest power. As indicated by block 60, the method comprises determining the memory order $L_i$ for the interfering signal having the greatest power. The memory order $L_i$ is determined by applying the method of FIG. 3 to the channel estimates for the interfering signal having the greatest power. It is straightforward to expand FIG. 4 to include multiple interferers.

Various known solutions exist for estimating the CIRs for the desired and interfering signals in TDMA wireless networks. For example, in GSM and ANSI-136, training sequences included in the burst format can be used for estimating the CIR. In GSM, there are a number of unique training sequence codes (TSCs) which are inserted in the middle of a typical GSM burst. For most anticipated vehicle speeds, the CIR estimated from the TSC is essentially constant over the entire burst which is approximately 0.577 ms in length. Thus, the CIR need only be calculated once in GSM networks. This is not typically the case for ANSI-136 networks where the burst length is 6.67 ms, within which time the channel can significantly change. In this case, the CIR based on the training sequence (which is called a "sync" word in ANSI-136) is interpolated over the burst.

To distinguish the desired signal from the interfering signal, the interfering signal should have a different TSC or sync word than the desired signal. Use of the herein-described techniques in a GSM or ANSI-136 network is promoted by proper TSC and sync word planning throughout a service area.

Figure 5:
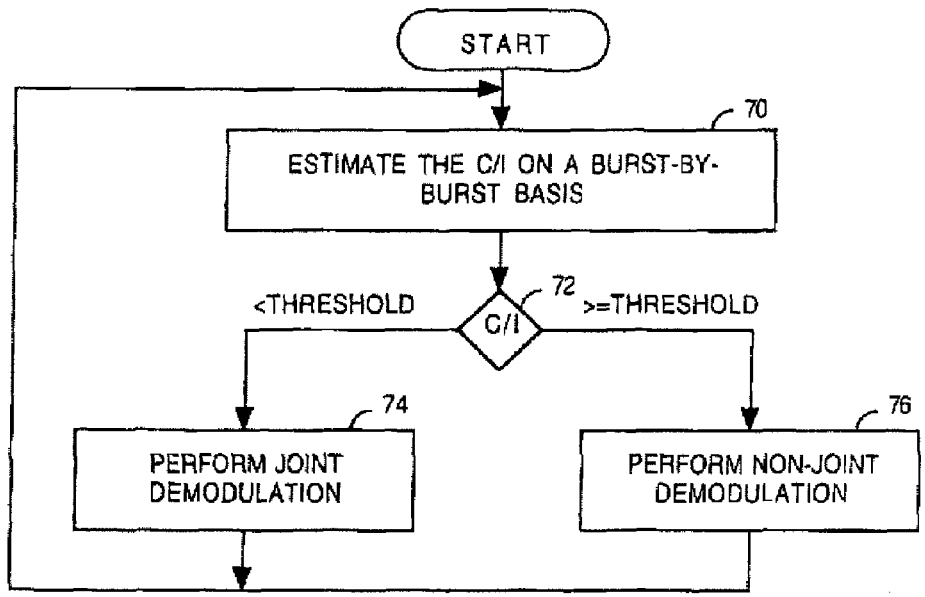
FIG. 5 is a flow chart of an embodiment of a method of adapting between conventional processing and joint demodulation processing.

FIG. 5 is a flow chart of an embodiment of a method of adapting between conventional processing and joint demodulation processing. As indicated by block 70, the method comprises estimating the C/I on a burst-by-burst basis. The previously-described CIR estimation process can be used to provide the C/I estimate. As indicated by block 72, the method comprises comparing the C/I to a threshold. If the C/I is less than the threshold, an act of performing joint demodulation processing is performed as indicated by block 74. If the C/I is greater than or equal to the threshold, an act of performing conventional processing (i.e. non-joint demodulation) is performed as indicated by block 76. There is no need for joint demodulation when the contribution to the received signal due to the interferer is negligible. Suitable, and optionally optimum, values of the threshold can be determined through a combination of simulations, lab testing and field trials.

Another aspect of embodiments of the present invention is its capability for use in both synchronous and asynchronous operation. By synchronous operation, it is meant that each burst emanating from a base station is synchronized with every other base station in the service area. By asynchronous operation, it is meant that the bursts are not synchronized.

Due to possible different propagation delays between the desired signal and the interfering signal, the desired signal and interfering signal may not be synchronized at the modulator symbol level even under synchronous operation. In other words, synchronous operation does not guarantee synchronized signals. For example, in a GSM downlink, a difference in propagation delay of about 3.33 microseconds results if the interfering base station is 1 km further away from the mobile station than the desired base station. This particular value of delay is significant with respect to a GSM symbol time of 3.69 microseconds, thus resulting in signals which are not synchronized.

Figure 6:
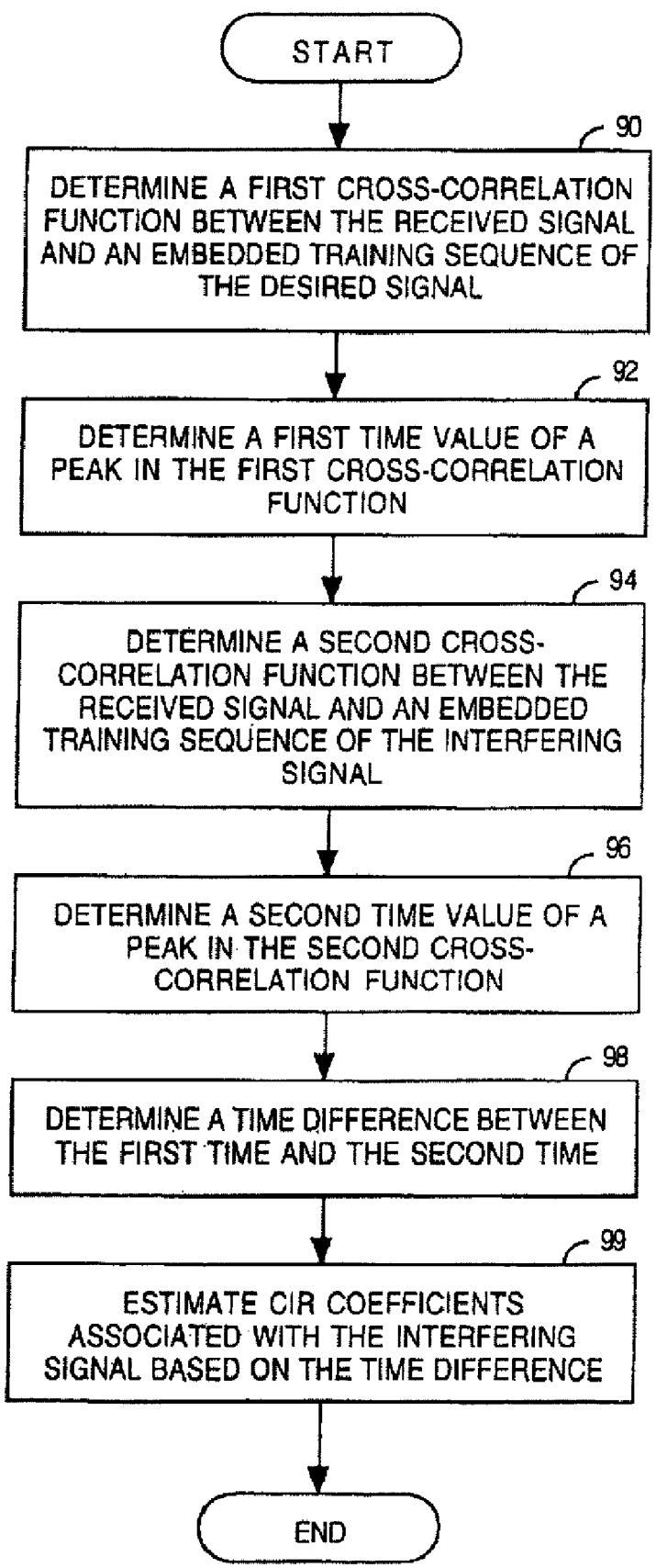
FIG. 6 is a flow chart of an embodiment of a method for compensating for different propagation delays.

FIG. 6 is a flow chart of an embodiment of a method for compensating for different propagation delays. As indicated by block 90, the method comprises determining a first cross-correlation function between the received signal and an embedded training sequence of the desired signal. The cross-correlation function can be used to provide an estimate of the CIR. As indicated by block 92, the method comprises determining a first time value of a peak in the first cross-correlation function. The time occurrence of the peak provides a time reference for the receiver.

As indicated by block 94, the method comprises determining at least one second cross-correlation function between the received signal and the training sequences of each of the possible interferers. This act is performed to determine the delay between the desired signal and the possible interferers. The cross-correlation function(s) can be used to provide estimates of the CIRs of the possible interferers. The interfering CIR with the greatest power indicates the most dominant interferer. Others of the possible inteferers whose signal power is within some threshold difference of the most dominant interfering signal may also be considered as dominant interferers.

As indicated by block 96, the method comprises determining a second time value of a peak in the second cross-correlation function for the dominant interferer. The time occurrence of the peak determines the propagation delay of the dominant interferer.

As indicated by block 98, the method comprises determining a time difference $t_d$ between the first time value and the second time value (i.e. between the time occurrences of the desired and interferer correlation peaks). As indicated by block 99, the time difference is used in the estimation of the interfering signal's CIR, and insures that the estimated signal is a faithful representation of the actual received signal.

For purposes of illustration and example, consider a GSM network employing GMSK modulation. For proper signal representation, the receiver samples the received signal at some multiple of the modulator symbol rate. For the GSM GMSK waveform, a sampling rate of four times the symbol rate has been found to be a good compromise between signal fidelity and processing required. Thus, in the CIR estimation process, the correlation peak can be resolved to a quarter of a symbol time, which is equal to approximately 0.923 microseconds. This time translates into a propagation distance of about 277 meters. Thus, the difference in propagation time between the desired signal and the interfering signal is in units of quarter symbol periods. Note that although the correlation peak is resolved to within a quarter of a symbol, the actual CIR coefficients are typically determined from a downsampled (at the symbol rate) version of the received signal to reduce the processing load. Thus, the CIR coefficient spacing is a symbol time.

Through simulations of the GMSK waveform, it has been found that the time difference determines the time shift required in the selection of the coefficients to be used for the interfering CIR. In one implementation of the CIR estimator, the training sequence of the desired signal is first correlated with the entire GSM burst. The coefficients for the desired signal CIR are determined by finding the L+1 contiguous coefficients with the most signal power. To find the interfering signal's CIR, the entire burst is then correlated with the dominant interferer's training sequence, however the actual coefficients selected are determined by the time difference $t_d$.

One approach to determining CIR coefficients is as follows. In the following description, the time difference $t_d$ is represented in integral units of quarter symbols. If $2 \geq t_d \geq 0$, then the interferer CIR coefficients $h_i$ are considered to occur at the same time as the desired signal CIR coefficients h. If $6 \geq t_d \geq 3$, then the $h_i$ locations are offset delayed by one sample relative to h. If $10 \geq t_d \geq 7$, then the $h_i$ locations are offset delayed by two samples relative to h. The process continues for increasing values of $t_d$, where the $h_i$ locations are offset delayed by $int((t_d+1)/4)$ samples relative to h, and where int( ) is the integer function.

If an interferer is closer in location than the desired signal, the $t_d$ values are negative. If $0 \geq t_d \geq -2$, then the $h_i$ locations occur at the same time as the h locations. If $-3 \geq t_d \geq -6$, then the $h_i$ locations are one sample ahead of the h locations. If $-7 \geq t_d \geq -10$, then the $h_i$ locations are two samples ahead of the h locations. The process continues for decreasing values of $t_d$, where the $h_i$ locations are ahead of the h locations by $int((1-t_d)/4)$ samples.

Embodiments of the present invention are able to process both synchronous and asynchronous systems, since both possibly require the processing of non-synchronized signals. A synchronous system is preferred since the average time difference is apt to be a much smaller value than would be determined in an asynchronous system. This smaller value helps narrow the search for the interferer's correlation peak, and may translate into a quicker and more reliable channel estimation process.

Figure 7:
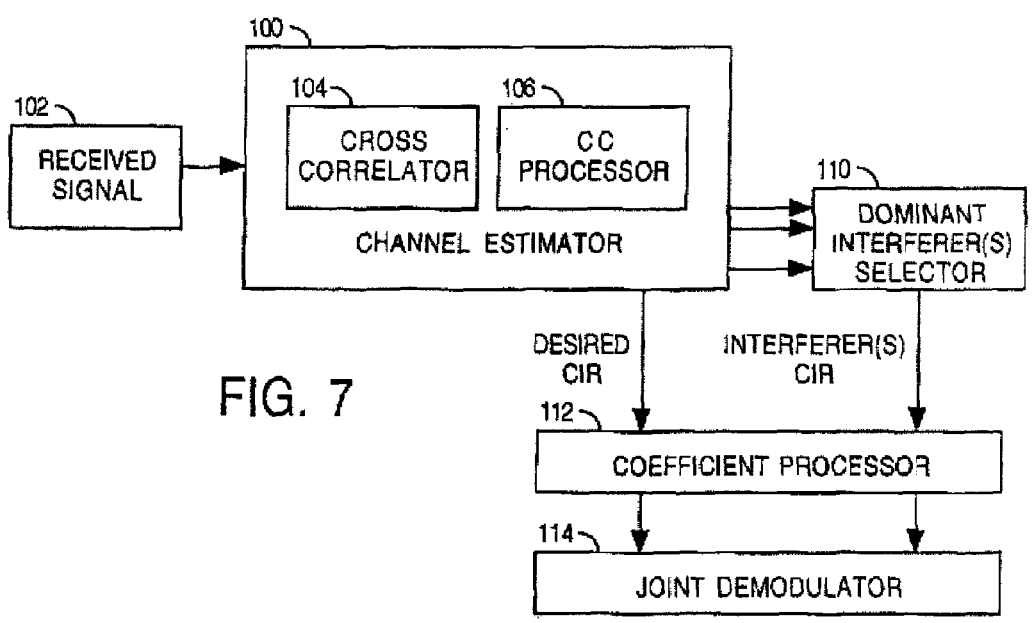
FIG. 7 is a block diagram of an embodiment of a receiver in accordance with the present invention.

To draw together the teachings herein, FIG. 7 shows a block diagram of an embodiment of a receiver in accordance with the present invention. The blocks in FIG. 7 are functional blocks which may be implemented by one or more components. Optionally, the functionality of one or more blocks is provided by a processor of a computer system. The processor may be directed by a computer-usable medium having computer program code embodied thereon to perform any of the acts described herein.

The receiver comprises a channel estimator 100 which performs the herein-disclosed CIR estimation acts based on a received signal 102. The channel estimator 100 also includes processing which performs the herein-disclosed cross-correlation acts based on the received signal 102. An integral cross-correlator 104 determines the cross correlation functions. An integral cross-correlator processor 106 processes the resulting cross correlation functions. The channel estimator 100 also includes processing to synchronize the receiver to the desired signal. An interfering signal selector 110 determines the dominant interfering signal(s). A coefficient processor 112 trims the CIR coefficients associated with the desired signal and the dominant interfering signal(s), thereby producing respective memory orders which dictate an adaptive number of states. A demodulator 114 jointly demodulates the desired signal and the dominant interfering signal(s) with a Viterbi equalizer having the adaptive total number of states.

Thus, there have been described herein methods and systems to perform a joint demodulation of desired and interfering signals having an adaptive total number of Viterbi equalizer states based on the power distribution of the respective CIR estimates. Beneficially, the Viterbi equalizer is matched to the current channel conditions. In this way, the processing and battery power are reduced, and preferably minimized, on a burst-by-burst basis.

In contrast, conventional joint demodulators fix the number of states based on the worst-case channel conditions (e.g. mountainous conditions) which typically do not occur often. Thus, the processing power is over provisioned in conventional system to take care of extreme cases.

By allocating processing power on an as-needed basis, freed-up processing power may be allocated to perform joint demodulation of the desired signal and one or more dominant interferers.

Any performance gain which results from the herein-disclosed teachings may be applied to any combination of: (a) tighter frequency reuse for both voice and data supporting higher spectral efficiency provided there is balance on the uplink, (b) higher data throughputs and higher voice quality in existing reuse patterns, and (c) potential deployment of the GSM Adaptive Multi-Rate (AMR) vocoder operating in the Half-Rate (HR) mode, which gives automatic doubling in voice capacity over the GSM Full-Rate (FR) or the enhance FR (EFR). In addition, embodiments of the present invention can be used on an uplink for base stations that only have room for one antenna.

It will be apparent to those skilled in the art that the disclosed inventions may be modified in numerous ways and may assume many embodiments other than the preferred forms specifically set out and described herein. For example, acts described with reference to FIGS. 3 to 6 may be performed either in a different order or in parallel.

Accordingly, it is intended by the appended claims to cover all modifications which fall within the true spirit and scope of the present invention.

The invention claimed is:

1. A method comprising:
   joint demodulating a desired signal and one or more interfering signals with a Viterbi equalizer having an adaptive total number of states based on channel impulse response (CIR) coefficients associated with the desired signal and the one or more interfering signals;
   establishing one of a first plurality of CIR coefficients associated with the desired signal having a greatest power as a first reference coefficient;
   determining a corresponding relative power of each CIR coefficient of the first plurality of CIR coefficients other than the first reference coefficient in relation to the first reference coefficient;
   determining a lowest index value of the first plurality of CIR coefficients whose relative power is above a first threshold value;
   determining a highest index value of the first plurality of CIR coefficients whose relative power is above the first threshold value; and determining a span of the first plurality of CIR coefficients to be used in the joint demodulating based on the lowest index value and the highest index value.

2. The method of claim 1, further comprising:
estimating the first plurality of CIR coefficients; and
determining a respective power in each of the first plurality of CIR coefficients.

3. The method of claim 2 further comprising:
establishing one of a second plurality of CIR coefficients associated with an interfering signal of the one or more interfering signals having a greatest power as a second reference coefficient;
determining a corresponding relative power of each non-reference CIR coefficient in the second plurality other than the second reference coefficient in relation to the second reference coefficient;
determining a lowest index value of the second plurality of CIR coefficients whose relative power is above a second threshold value;
determining a highest index value of the second plurality of CIR coefficients whose relative power is above the second threshold value; and
determining a span of the second plurality of CIR coefficients to be used in said joint demodulating based on the lowest index value and the highest index value.

4. The method of claim 3 wherein the first threshold value is equal to the second threshold value.

5. The method of claim 1 further comprising:
determining a first time value of a peak in a first cross-correlation function between a received signal and an embedded training sequence of the desired signal;
determining a second time value of a peak in a second cross-correlation function between the received signal and an embedded training sequence of an interfering signal of the one or more interfering signals; and
estimating a plurality of CIR coefficients associated with the interfering signal based on a time difference between the first time value and the second time value.

6. The method of claim 5 wherein said estimating comprises:
if the time difference is greater than zero, offsetting the CIR coefficients associated with the interfering signal by int$((1+t_d)/4)$ samples in a first direction relative to CIR coefficients associated with the desired signal; and
if the time difference is less than zero, offsetting the CIR coefficients associated with the interfering signal by int$((1-t_d)/4)$ samples in a second direction relative to the CIR coefficients associated with the desired signal, the second direction opposite the first direction;
wherein int( ) represents an integer function, and $t_d$ represents the time difference as an integral number of quarter symbol periods.

7. The method of claim 1 further comprising:
detecting a plurality of interfering signals; and
determining at least one dominant interfering signal of the plurality of interfering signals;
wherein the one or more interfering signals considered in said joint demodulating comprises the at least one dominant interfering signal.

8. The method of claim 7 wherein each of the at least one dominant interfering signal has a signal power which is within some threshold difference of the dominant interfering signal having a greatest power.

9. A system comprising:
a demodulator to jointly demodulate a desired signal and one or more interfering signals with a Viterbi equalizer having an adaptive total number of states based on channel impulse response (CIR) coefficients associated with the desired signal and the one or more interfering signals; and
a coefficient processor operative to:
establish one of a first plurality of CIR coefficients associated with the desired signal having a greatest power as a first reference coefficient;
determine a corresponding relative power of each CIR coefficient of the first plurality of CIR coefficients other than the first reference coefficient in relation to the first reference coefficient;
determine a lowest index value of the first plurality of CIR coefficients whose relative power is above a first threshold value;
determine a highest index value of the first plurality of CIR coefficients whose relative power is above the first threshold value; and
determine a span of the first plurality of CIR coefficients to be used in the joint demodulating based on the lowest index value and the highest index value.

10. The system of claim 9, further comprising:
a channel estimator to estimate the first plurality of CIR coefficients.

11. The system of claim 9, wherein the coefficient processor is further operative to:
establish one of a second plurality of CIR coefficients associated with an interfering signal of the one or more interfering signals having a greatest power as a second reference coefficient,
determine a corresponding relative power of each CIR coefficient in the second plurality of CIR coefficients other than the second reference coefficient in relation to the second reference coefficient,
determine a lowest index value of the second plurality of CIR coefficients whose relative power is above a second threshold value, to
determine a highest index value of the second plurality of CIR coefficients whose relative power is above the second threshold value, and to
determine a span of the second plurality of CIR coefficients to be used by the demodulator based on the lowest index value and the highest index value.

12. The system of claim 11 wherein the first threshold value is equal to the second threshold value.

13. The system of claim 9 further comprising a channel estimator which comprises:
a cross-correlation processor operative to:
determine a first time value of a peak in a first cross-correlation function between a received signal and an embedded training sequence of the desired signal,
determine a second time value of a peak in a second cross-correlation function between the received signal and an embedded training sequence of an interfering signal of the one or more interfering signals; and
a channel estimator operative to estimate a plurality of CIR coefficients associated with the interfering signal based on a time difference between the first time value and the second time value.

14. The system of claim 13 wherein the channel estimator is to offset the CIR coefficients associated with the interfering signal by int$((1+t_d)/4)$ samples in a first direction relative to CIR coefficients associated with the desired signal if the time difference is greater than zero, and to offset the CIR coefficients associated with the interfering signal by int$((1-t_d)/4)$ samples in a second direction relative to the CIR coefficients associated with the desired signal if the time difference is less than zero, wherein the second direction opposite the first direction, wherein int( ) represents an integer function, and wherein $t_d$ represents the time difference as an integral number of quarter symbol periods.

15. The system of claim 9 further comprising:
an interfering signal selector to determine at least one dominant interfering signal of a plurality of detected interfering signals;
wherein the one or more interfering signals considered by the demodulator comprises the at least one dominant interfering signal.

16. The system of claim 15 wherein each of the at least one dominant interfering signal has a signal power which is within some threshold difference of the dominant interfering signal having a greatest power.

17. A computer-readable storage medium comprising a set of instructions operative to direct a processor to perform acts of:
joint demodulating a desired signal and one or more interfering signals with a Viterbi equalizer having an adaptive total number of states based on channel impulse response (CIR) coefficients associated with the desired signal and the one or more interfering signals;
establishing one of a first plurality of CIR coefficients associated with the desired signal having a greatest power as a first reference coefficient;
determining a corresponding relative power of each CIR coefficient of the first plurality of CIR coefficients other than the first reference coefficient in relation to the first reference coefficient;
determining a lowest index value of the first plurality of CIR coefficients whose relative power is above a first threshold value;
determining a highest index value of the first plurality of CIR coefficients whose relative power is above the first threshold value; and
determining a span of the first plurality of CIR coefficients to be used in the joint demodulating based on the lowest index value and the highest index value.

18. The computer-readable storage medium of claim 17, further comprising a set of instructions to direct a processor to perform acts of:
estimating the first plurality of CIR coefficients; and
determining a respective power in each of the first plurality of CIR coefficients.

19. The computer-readable storage medium of claim 18, further comprising a set of instructions to direct a processor to perform acts of:

establishing one of a second plurality of CIR coefficients associated with an interfering signal of the one or more interfering signals having a greatest power as a second reference coefficient;
determining a corresponding relative power of each CIR coefficient in the second plurality of CIR coefficients other than the second reference coefficient in relation to the second reference coefficient;
determining a lowest index value of the second plurality of CIR coefficients whose relative power is above a second threshold value;
determining a highest index value of the second plurality of CIR coefficients whose relative power is above the second threshold value; and
determining a span of the second plurality of CIR coefficients to be used in said joint demodulating based on the lowest index value and the highest index value.

20. The computer-readable storage medium of claim 19, wherein the first threshold value is equal to the second threshold value.

21. The computer-readable storage medium of claim 17, further comprising a set of instructions to direct a processor to perform acts of:
determining a first time value of a peak in a first cross-correlation function between a received signal and an embedded training sequence of the desired signal;
determining a second time value of a peak in a the second cross-correlation function between the received signal and an embedded training sequence of an interfering signal of the one or more interfering signals; and
estimating a plurality of CIR coefficients associated with the interfering signal based on a time difference between the first time value and the second time value.

22. The computer-readable storage medium of claim 21, further comprising a set of instructions to direct a processor to perform acts of:
if the time difference is greater than zero, offsetting the CIR coefficients associated with the interfering signal by int $((1+t_d)/4)$ samples in a first direction relative to CIR coefficients associated with the desired signal; and
if the time difference is less than zero, offsetting the CIR coefficients associated with the interfering signal by int $((1-t_d)/4)$ samples in a second direction relative to the CIR coefficients associated with the desired signal, the second direction opposite the first direction;
wherein int( ) represents an integer function, and $t_d$ represents the time difference as an integral number of quarter symbol periods.

* * * * *